US009602969B2

United States Patent
Park et al.

(10) Patent No.: US 9,602,969 B2
(45) Date of Patent: Mar. 21, 2017

(54) METHOD AND ELECTRONIC DEVICE FOR RECOGNIZING AREA

(71) Applicant: Samsung Electronics Co., Ltd., Gyeonggi-do (KR)

(72) Inventors: Chan-Soo Park, Seoul (KR); Jeong-Gwan Kang, Gyeonggi-do (KR); Nam-Hoon Kim, Gyeonggi-do (KR); Hyeon-Seong Kim, Seoul (KR); Sun-Young Park, Gyeonggi-do (KR); Hyun-Su Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 52 days.

(21) Appl. No.: 14/815,406

(22) Filed: Jul. 31, 2015

(65) Prior Publication Data

US 2016/0037298 A1 Feb. 4, 2016

(30) Foreign Application Priority Data

Jul. 31, 2014 (KR) ......................... 10-2014-0098202

(51) Int. Cl.
*H04W 4/02* (2009.01)
*G01C 21/36* (2006.01)
*H04W 64/00* (2009.01)
*G01C 21/20* (2006.01)
*H04W 48/16* (2009.01)
*H04W 84/12* (2009.01)

(52) U.S. Cl.
CPC ............ *H04W 4/021* (2013.01); *G01C 21/20* (2013.01); *G01C 21/3679* (2013.01); *H04W 4/028* (2013.01); *H04W 48/16* (2013.01); *H04W 64/00* (2013.01); *H04W 84/12* (2013.01)

(58) Field of Classification Search
CPC ..... H04W 4/021; H04W 4/028; H04W 64/00; H04W 84/12; H04W 48/16; G01C 21/3679; G01C 21/20
USPC ......... 455/432.1–435.3, 456.3; 370/328–338
See application file for complete search history.

(56) References Cited

U.S. PATENT DOCUMENTS

| 8,204,502 B2 * | 6/2012 | Khetawat ................ H04W 8/04 370/230 |
| 8,536,999 B2 | 9/2013 | Holcman et al. |
| 2008/0076419 A1 * | 3/2008 | Khetawat ............ H04L 12/2602 455/435.1 |
| 2009/0061870 A1 * | 3/2009 | Finkelstein ........... H04W 48/20 455/435.2 |

(Continued)

FOREIGN PATENT DOCUMENTS

KR  10-2012-0054671  5/2012

OTHER PUBLICATIONS

Kojiro Takeyama et al, Trajectory estimation improvement based on time-series constraint of GPS Doppler and INS in urban areas, Aichi, Japan, 2012, IEEE.

(Continued)

*Primary Examiner* — Sharad Rampuria
(74) *Attorney, Agent, or Firm* — The Farrell Law Firm, P.C.

(57) ABSTRACT

A method of recognizing an area by an electronic device is provided. The method includes identifying area information for the electronic device and determining whether the electronic device enters a Point Of Interest (POI), using Access Point (AP) information included in the identified area information.

24 Claims, 12 Drawing Sheets

(56) References Cited

U.S. PATENT DOCUMENTS

| | | | |
|---|---|---|---|
| 2011/0013569 A1* | 1/2011 | Scherzer | H04W 48/14 370/329 |
| 2013/0225165 A1* | 8/2013 | Das | H04W 48/16 455/434 |
| 2014/0342662 A1* | 11/2014 | Das | H04W 4/02 455/39 |
| 2014/0357267 A1* | 12/2014 | Carranza | H04W 48/16 455/434 |
| 2015/0087302 A1* | 3/2015 | Yang | H04W 48/16 455/434 |
| 2015/0099546 A1* | 4/2015 | Heo | H04W 4/02 455/456.3 |
| 2016/0050541 A1* | 2/2016 | Youssef | H04W 4/043 370/338 |
| 2016/0113045 A1* | 4/2016 | Kang | H04W 76/02 370/338 |
| 2016/0242025 A1* | 8/2016 | Aliyar | H04W 12/04 |

OTHER PUBLICATIONS

Information & Electronics Research Division Toyota Central Research & Development Laboratory.

* cited by examiner

METHOD AND ELECTRONIC DEVICE FOR RECOGNIZING AREA

PRIORITY

This application priority under 35 U.S.C. §119(a) to Korean Patent Application Serial No. 10-2014-0098202, which was filed in the Korean Intellectual Property Office on Jul. 31, 2014, the entire disclosure of which is incorporated herein by reference.

BACKGROUND OF THE INVENTION

1. Field of the Invention

The present invention relates generally to a method and an apparatus for recognizing an area, and more particularly, to a method and an apparatus for automatically recognizing a point of interest.

2. Description of the Related Art

Recent electronic devices enable a user to become aware of an entrance to a configured area, using a geo-fencing technique, which uses a method in which entrance to an area is recognized utilizing a separate module or a method in which a user directly registers an area of interest (i.e., a point of interest).

However, since existing electronic devices use a server based interest space extracting method in order to minimize a calculation amount when a point of interest is extracted, problems such as a leakage of personal information may occur. In addition, existing electronic devices cannot divide a point of interest where a user visits and cannot automatically recognize a point of interest.

SUMMARY OF THE INVENTION

The present invention has been made to address at least the above mentioned problems and/or disadvantages and to provide at least the advantages described below.

According to an aspect of the present invention, an electronic device that is capable of automatically configuring a point of interest and recognizing the point of interest is provided.

In accordance with an aspect of the present invention, there is provided a method of recognizing an area by an electronic device. The method includes identifying area information for the electronic device and determining whether the electronic device enters a Point Of Interest (POI), using Access Point (AP) information included in the identified area information.

In accordance with an aspect of the present invention, there is provided an electronic device for recognizing an area. The electronic device includes an area recognizing module that identifies area information for the electronic device and a processor that determines whether the electronic device enters a POI, using AP information included in the identified area information.

According to an aspect of the present invention, an electronic device that can minimize a calculation amount and extract a point of interest without a designation of a user is provided.

According to an aspect of the present invention, an electronic device that independently determines and recognizes a point of interest, and thus prevents leakage of a user's personal information is provided.

According to an aspect of the present invention, an electronic device that can automatically execute a configuration and a function of a terminal corresponding to the point of interest when the electronic device enters a point of interest is provided.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
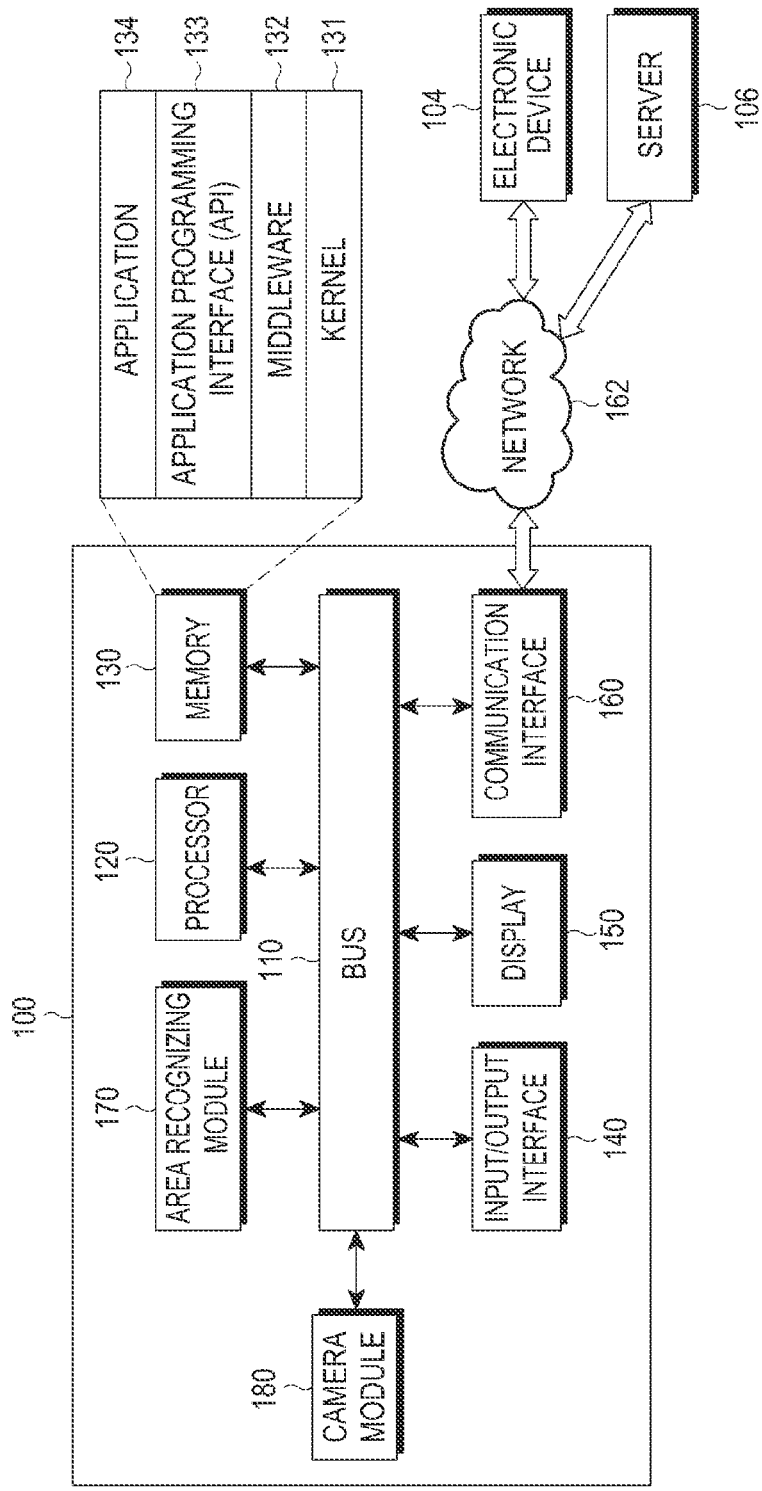
FIG. 1 is a diagram illustrating a network environment including an electronic device, according to an embodiment of the present invention.

Hereinafter, the present invention is described with reference to the accompanying drawings. The present invention may have various modifications and embodiments and thus will be described in detail with reference to specific embodiments illustrated in the drawings. However, it should be understood that there is no intent to limit the present invention to the particular forms disclosed herein; rather, the present invention should be construed to cover all modifications, equivalents, and/or alternatives falling within the spirit and scope of the invention. In the description of the drawings, identical or similar reference numerals are used to designate identical or similar elements.

As used herein, the expression "include" or "may include" refers to the existence of a corresponding function, operation, or element, and does not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used here, the expression "or" includes any or all combinations of words enumerated together. For example, the expression "A or B" may include A, may include B, or may include both A and B.

In the present invention, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The term "module" may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" may include at least one of an Application-Specific Integrated Circuit (ASIC) chip, a Field-Programmable Gate Arrays (FPGAs), and a programmable-logic device for performing operations which have been known or are to be developed hereafter.

The terms used in the present invention are only used to describe specific embodiments, and are not intended to limit the present invention. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to the present invention may be a device including an area information generation or recognition function. For example, the area may be a place which a user of the electronic device frequently enters or exits. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance having an area information generation or recognition function. The smart home appliance, for example, may include at least one of a television, a digital video disk (DVD) player, an audio player, a refrigerator, an air conditioner, a cleaner, an oven, a microwave oven, a washing machine, an air purifier, a set-top box, a TV box, a game console, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. The electronic device may be a combination of one or more of the aforementioned various devices. Further, the electronic device is not limited to the aforementioned devices.

Hereinafter, an electronic device according to various embodiments of the present invention will be described with reference to the accompanying drawings. In various embodiments, the term "user" may indicate a person using an electronic device or a device (e.g. an artificial intelligence electronic device) using an electronic device.

FIG. 1 is a diagram illustrating a network environment including an electronic device 100, according to an embodiment of the present invention.

Referring to FIG. 1, the electronic device 100 includes a bus 110, a processor 120, a memory 130, an input/output interface 140, a display 150, a communication interface 160, an area recognizing module 170 and a camera module 180.

The area recognizing module 170 processes at least a part of information acquired from other components (e.g. the processor 120, the memory 130, the input/output interface 140, the communication interface 160, the camera module 180 etc.) and provides the processed part of the information to a user in various schemes, as described in greater detail below.

The area recognizing module 170 identifies area information for a position of the electronic device 100 and determines whether the electronic device 100 enters a Point Of Interest (POI), using Access Point (AP) information provided in the area information, using or independently from the processor 120. The area information may further include position information for the position of the electronic device 100, and the AP information may include a Wi-Fi AP list recognized at the position and signal intensity information of the AP. Here, the position information may be information for the position of the electronic device 100 based on GPS information received at the electronic device.

The area recognizing module 170 determines a scan period for identifying the area information according to state information of the electronic device 100. The state information of the electronic device 100 may include at least one of information on how long the electronic device 100 stays at a particular position, information on an activated application (hereinafter simply referred to as "app"), information on telephone use, and information on messenger use. For example, when the electronic device 100 executes an app at a position A, the area recognizing module 170 simultaneously executes the app and scans the area information.

When the area recognizing module 170 determines that the position where the electronic device 100 is currently positioned is not the POI, the area recognizing module 170 identifies a distance between the position of the electronic device 100 and a peripheral POI and a movement of the electronic device 100, and determines a scan period of the area information corresponding to the distance and the movement of the electronic device 100. Therefore, battery consumption of the electronic device 100, which is unnecessary by a scan period, may be prevented, and the POI may be determined.

The area recognizing module 170 identifies an app corresponding to the POI and executes the app when the electronic devices 100 enters the POI. For example, in a case wherein a bus stop A is the POI and a user uses a bus app at the bus stop A, when the electronic device 100 is positioned at the bus stop A, the bus app may be executed automatically or through a specific gesture of the user. For example, the specific gesture may include an operation in which a user shakes the electronic device 100, an operation in which a home button of the electronic device 100 is pushed for a long time by the user, and an operation in which a specific drag pattern is input to a display of the electronic device 100 by the user.

The area recognizing module 170 extracts a specific area using grid, map-based clustering and K-Means clustering, maps area information including at least one of a Wi-Fi AP list measured in the specific area, AP information including signal intensity information of the AP, and state change information of the electronic device 100 with position information of the specific area, stores the area information, and extracts the POI from the specific area. In addition, the area recognizing module 170 may determine a similarity between a Wi-FI AP list of an area where the electronic device 100 is positioned with a pre-stored Wi-Fi AP list in the electronic device 100. Also, the area recognizing module 170 compares an intensity of each Wi-Fi AP list an area where the electronic device 100 is positioned with an intensity of each pre-stored Wi-Fi AP list so that the area recognizing module 170 determines the similarity. And if a value of the similarity is greater than or equal to a predetermined value, the area recognizing module 170 determines that the area an area where the electronic device 100 is positioned is equal to an area corresponding to the pre-stored Wi-Fi AP list, calculates the number of visits to the area, and when the number is greater than or equal to a critical value, determines that the area is the POI.

The area recognizing module 170 determines whether the electronic device 100 enters the POI using the AP information provided in the area information, compares a Wi-FI AP list in the AP information and Wi-Fi AP list pre-stored in the electronic device 100, and when a value of the comparison is greater than or equal to a critical value, determines that the electronic device 100 is in the POI.

The area recognizing module 170 measures the AP information in the POI, identifies whether the AP information is representative AP information stored in a server, and executes an app corresponding to the representative AP information. For example, when cafes of a brand D are in a position A, a position B and a position C, the cafes of the brand D provide different AP information, and when the electronic device 100 stores the cafe of brand D positioned at the position A as the POI, the electronic device 100 may enter the cafe of brand D position at the position B for the first time. When the cafe of brand D positioned at the position B provides representative AP information of the cafe of brand D, the area recognizing module 170 recognizes the cafe of brand D positioned at the position B as the POI as being equal to that of the cafe of brand D positioned at the position A. Thus, the area recognizing module 170 executes an app corresponding to the representative AP information.

The area recognizing module 170 updates the area information for the position of the electronic device 100. The area information may further include position information for the position of the electronic device 100, and the AP information may include at least one of a Wi-Fi AP list recognized at the position, signal intensity information of the AP, and information on the app corresponding to the position information.

That is, the area recognizing module 170 replaces a pre-stored Wi-Fi AP list and signal intensity information of the Wi-Fi AP corresponding to the area with a new Wi-Fi AP list and signal intensity information of the Wi-Fi AP for the area, and stores the new Wi-Fi AP list and the signal intensity information of the Wi-Fi AP. The area recognizing module 170 maps the number of visits to the area, a type of an app activated in the area, the number of activations of the app, and the position information of the area, and stores the number of visits to the area, the type of the app activated in the area, the number of activations of the app, and the position information of the area. The area recognizing module 170 determines a representative app and a representative Wi-Fi AP corresponding to the representative app, using the mapped information. In addition, the area recognizing module 170 determines whether the electronic device 100 enters the POI, using the representative Wi-Fi AP corresponding to the area and the representative Wi-Fi AP signal intensity.

In addition, after updating is performed, the area recognizing module 170 deletes the Wi-Fi AP list, the signal intensity information of the Wi-Fi AP, the number of visits to the area, the type of the app activated in the area, and the number of activations of the app, except for the representative app and the representative Wi-Fi AP, from a memory. Thus, unnecessary memory consumption can be prevented.

For example, when pre-stored area information includes a position A, a Wi-Fi AP list recognized at the position A, the signal intensity information of the AP, and information on a representative app B at the position A, the area recognizing module 170 updates the pre-stored area information as a Wi-Fi AP list newly recognized at the position A and the signal intensity information of the AP, and a representative app may be updated as another type of app rather than a representative app B, which is mainly used at the position A by the user. In addition, the recognized Wi-Fi AP list and the signal intensity information of the AP which are pre-stored at the position A may be deleted.

The memory 130 stores a command or data received from the processor 120 or other component elements (e.g., the input/output interface 140, the display 150, the communication interface 160, the area recognizing module 170, the camera module 180, etc.), or generated by the processor 120 or other component elements. The memory 130 includes programming modules, e.g., a kernel 131, a middleware 132, an Application Programming Interface (API) 133, an application 134, etc. Each of the aforementioned programming modules may be formed of software, firmware, hardware, or a combination of at least two thereof.

The kernel 131 controls or manages system resources (e.g., the bus 110, the processor 120, the memory 130, etc.), used for executing an operation or a function implemented in other programming modules, e.g., the middleware 132, the API 133, or the application 134. Further, the kernel 131 provides an interface that enables the middleware 132, the API 133, or the application 134 to access an individual component element of the electronic device 100 for control or management.

The middleware 132 functions as a relay so that the API 133 or the application 134 executes communication with the kernel 131, and receives and transmits data. Further, in association with operation requests received from the application 134, the middleware 132 executes a control (e.g., scheduling or load balancing) for an operation request, using for example, a method of assigning, to at least one application 134, a priority for use of a system resource (e.g. for example, the bus 110, the processor 120, the memory 130, etc.) of the electronic device 100.

The API 133 is an interface used by the application 134 to control a function provided from the kernel 131 or the middleware 132, and may include, for example, at least one interface or function (e.g. a command) for a file control, a window control, image processing, a character control, etc.

The application 134 may include an area recognizing application, an SMS/MMS application, an e-mail application, a calendar application, an alarm application, a health care application (e.g., an application measuring quantity of motion or a blood sugar) or an environment information application (e.g., an application providing information on a pressure, a humidity and a temperature), a bus application, a memo application, a coupon application, and the like. Additionally or alternatively, the application 134 may be an application associated with exchanging of information between the electronic device 100 and an external electronic device, for example, an electronic device 104. The application related to the information exchange may include, for example, a notification transmission application for transferring predetermined information to an external electronic device or a device management application for managing an external electronic device.

For example, the notification transmission application may include a function of transferring, to the external electronic device (e.g., the electronic device 104), notification information generated from other applications of the electronic device 100 (e.g. an SMS/MMS application, an e-mail application, a health management application, an environmental information application, etc.) Additionally or alternatively, the notification transmission application may, for example, receive notification information from an external electronic device to provide the notification information to a user. The device management application may manage (e.g., install, delete, or update), for example, a function of at least a part of an external electronic device that communicates with the electronic device 100 (e.g., turning on/off the external electronic device (or a few components) or adjusting brightness (or resolution) of a display), an application operated in the external electronic device, or a service provided from the external electronic device (e.g. a call service or a message service).

The application 134 may include an application designated according to properties (e.g., a type of the electronic device) of an external electronic device. For example, in a case where the external electronic device is an MP3 player, the application 134 may include an application related to the reproduction of music. Similarly, when the external electronic device is a mobile medical device, the application 134 may include an application related to health care. The application 134 may include at least one of an application designated to the electronic device 100 and an application received from an external electronic device (e.g. a server 106 or the electronic device 104).

The memory 130 stores the area information of the electronic device 100 or the state information of the electronic device 100. The state information of the electronic device 100 may include information on how long the electronic device 100 stays at a position, information on an activated app, information on telephone use, and information on messenger use.

In addition, the memory 130 stores the Wi-Fi AP list recognized at the current position of the electronic device 100 and the signal intensity information of the AP in order to determine whether the electronic device 100 enters a POI. In addition, the memory 130 stores the position information of the electronic device 100, and the position information may include GPS information indicating the current position of the electronic device 100. For example, the memory 130 maps and stores the GPS information, the Wi-Fi AP list recognized in the GPS information and the signal intensity information of each Wi-Fi AP corresponding to the Wi-Fi AP list. In addition, for example, the electronic device maps the area information with the state information and stores the area information and the state information in the memory 130. That is, the electronic device 100 maps a position A, a W-Fi AP list recognized at the position A, each Wi-Fi AP signal intensity corresponding to the Wi-Fi AP list, and state information of the electronic device 100 at the position A, and stores the position A, the Wi-Fi AP list recognized at the position A, each Wi-Fi AP signal intensity corresponding to the Wi-Fi AP list, and the state information of the electronic device at the position A in the memory 130.

The processor 120 receives commands from the above-described other elements (e.g., the memory 130, the input/output interface 140, the display 150, and the communication interface 160, the area recognizing module 170, and the like) through the bus 110, interprets the received commands, and executes calculation or data processing according to the interpreted commands.

In addition, the processor 120 may include the area recognizing module 170, and may perform an operation of the area recognizing module 170 when the electronic device 100 does not include the area recognizing module 170. In addition, the processor 120 may perform at least one operation of the area recognizing module 170, as described above.

The bus 110 may be a circuit that interconnects the above-described elements and delivers communications (e.g., a control message) between the above-described elements.

The input/output interface 140 transfers a command or data input by a user through an input/output device (e.g., a sensor, a keyboard, or a touch screen), to the processor 120, the memory 130, the communication interface 160, and the area recognizing module 170, for example, through the bus 110. For example, the input/output interface 140 provides, to the processor 120, data associated with a touch of a user input through a touch screen of the display 150. Further, the input/output interface 140 outputs, for example, a command or data received through the bus 110 from the processor 120, the memory 130, the communication interface 160, and the area recognizing module 170, through an input/output device (e.g., a speaker or display). For example, the input/output interface 140 outputs voice data processed through the processor 120 to the user through the speaker.

The display 150 displays various information (e.g., multimedia data, text data, or the like) and an image to a user.

The communication interface 160 provides a connection for communication between the electronic device 100 and another electronic device (e.g., the electronic device 104 or the server 106). For example, the communication interface 160 may be connected to the network 162 through wireless communication or wired communication, and may communicate with an external device. The wireless communication may include at least one of, for example, Wi-Fi, Bluetooth (BT), Near Field Communication (NFC), Global Positioning System (GPS) and cellular communication (e.g. LTE, LTE-A, CDMA, WCDMA, UMTS, WiBro, GSM, etc.). The wired communication may include at least one of, for example, a Universal Serial Bus (USB), a High Definition Multimedia Interface (HDMI), a Recommended Standard 232 (RS-232), and a Plain Old Telephone Service (POTS).

The camera module 180 determines whether an image is the POI or a specific area using area information for the image photographed by the electronic device 100. For example, when the POI of the electronic device 100 is stored as a cafe of brand B positioned at a position A and the electronic device 100 is in a cafe of brand B positioned in a new position C by a movement of the electronic device 100, the camera module 180 recognizes that the cafe of brand B positioned at the position C is the POI by photographing the brand B.

The network 162 may be a telecommunication network. The telecommunication network may include at least one of a computer network, Internet, Internet of things, and a telephone network. A protocol (e.g. a transport layer protocol, a data link layer protocol, or a physical layer protocol) for the communication between the electronic device 100 and an external device may be supported by at least one of the application 134, the application programming interface 133, the middleware 132, the kernel 131, and the communication interface 160.

Figure 2:
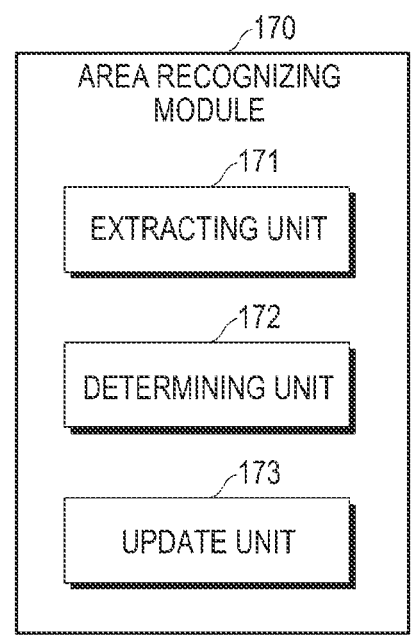
FIG. 2 is a diagram illustrating a configuration of an area recognizing module, according to an embodiment of the present invention.

FIG. 2 is a diagram illustrating a configuration of the area recognizing module 170, according to an embodiment of the present invention.

Referring to FIG. 2, the area recognizing module 170 includes an extracting unit 171, a determining unit 172 and an update unit 173.

The extracting unit 171 extracts a specific area using a grid-map based clustering or a K-means clustering, using or independently from the processor 120. Area information including at least one of a Wi-Fi AP list measured in a specific area, AP information including signal intensity information of the AP, and state change information of the electronic device 100 with position information of the specific area, and the area information is stored. The POI may be extracted from the specific area.

The determining unit 172 may determine a similarity between a Wi-Fi AP list of an area where the electronic device 100 is positioned and a pre-stored Wi-Fi AP list in the electronic device 100. And if a value of the similarity is greater than a predetermined value, the determining unit 172 determines that the area where the electronic device 100 is positioned is equal to an area corresponding to the pre-stored Wi-Fi AP list. The similarity may be determined by comparing each signal intensity "high", "medium" and "low" of the Wi-Fi APs "a", "b" and "c" of the area where the electronic device 100 is positioned with each signal intensity "high", "high" and "medium" of the Wi-Fi AP "a", "b" and "d" pre-stored in the electronic device. For example, even though "c" of the Wi-Fi AP of the area where the electronic device 100 is positioned is different from "d" of the Wi-Fi AP pre-stored in the electronic device 100, i.e., the comparison is greater than a predetermined critical value, it may be determined that the area is the area equal to the pre-stored area. The similarity is acquired by using an intensity between the Wi-Fi AP list of an area where the electronic device 100 is positioned and a pre-stored Wi-Fi AP list in the electronic device 100. That is, the intensity of the Wi-Fi AP is compared with an intensity of the pre-stored Wi-Fi AP in the electronic device 100. In addition, the determining unit 172 calculates a number of visits to the area, and when the number is greater than or equal to a critical value, the determining unit 172 determines that the area is the POI. The determining unit 172 determines whether the electronic device 100 enters the POI using the AP information provided in the area information, compares an intensity of a Wi-Fi AP list in the AP information and an intensity of a Wi-Fi AP list pre-stored in the electronic device 100, and when a value of the comparison (ex., similarity) is greater than or equal to a critical value, the determining unit 172 determines that the electronic device 100 is in the POI. The determining unit 172 determines a scan period for identifying area information according to state information of the electronic device 100. The state information of the electronic device 100 may include, but is not limited to, information on how long the electronic device 100 stays at a particular position, information on an activated app, information on telephone use, and information on messenger use. For example, when the determining unit 172 executes an app at a position A, the determining unit 172 simultaneously executes the app and scans the area information.

When the determining unit 172 determines that the current position of the electronic device 100 is not the POI, the determining unit 172 identifies a distance between the current position of the electronic device 100 and a peripheral POI, and movement of the electronic device 100. The determining unit 172 determines a scan period of the area information corresponding to the identified distance and the movement of the electronic device 100.

The determining unit 172 identifies the app corresponding to the POI, and when the electronic device 100 enters the POI, the determining unit 172 executes the identified app.

The determining unit 172 measures AP information in the POI, identifies whether the AP information is representative AP information stored in the server, and executes an app corresponding to the representative AP information.

The update unit 173 updates the area information for the position of the electronic device 100. The area information may include position information for the position of the electronic device 100. The AP information may include, but is not limited to, a Wi-Fi AP list recognized at the position, signal intensity information of the AP, and information on the app corresponding to the position information.

The update unit 173 replaces a pre-stored Wi-Fi AP list and signal intensity information of the Wi-Fi AP corresponding to an area with a new Wi-Fi AP list and signal intensity information of the Wi-Fi AP for a new area, and stores the Wi-Fi AP list and the signal intensity information of the Wi-Fi AP. The update unit 173 maps and stores the number of visits to an area, a type of an app activated in an area, the number of activations of the app, and the position information of an area. The update unit 173 determines a representative app and a representative Wi-Fi AP corresponding to the representative app, using the mapped information. The determining unit 172 determines whether the electronic device 100 enters a POI, using the representative Wi-Fi AP corresponding to an area, and a signal intensity of the representative Wi-Fi AP.

After the updating is performed, the update unit 173 deletes the Wi-Fi AP list, the signal intensity information of the Wi-Fi AP, the number of visits to an area, the type of the app activated in an area, and the number of activations of the app, except for the representative app and the representative Wi-Fi AP.

Figure 3A:
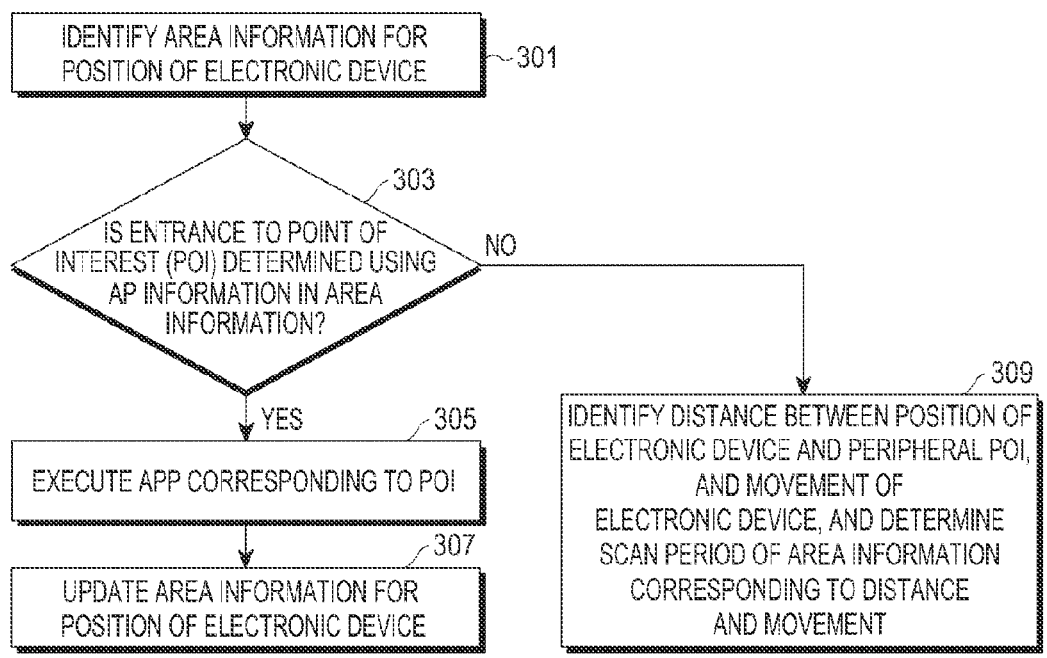
FIG. 3A is a flowchart illustrating a method of an electronic device, according to an embodiment of the present invention.

FIG. 3A is a flowchart illustrating a method of the electronic device 100, according to an embodiment of the present invention.

Referring to FIG. 3A, the electronic device 100 identifies area information for a position of the electronic device 100, at step 301. The position may be the position where the electronic device 100 is located. The area information, for example, may include the position information of the electronic device 100 and AP information. The position information may include the coordinate information using a GPS. The AP information may include the Wi-Fi AP list recognized at the position where the electronic device 100 is located, and the signal intensity information of the AP.

In addition, the area information may include information on a type of an app activated in the electronic device 100, information the number of visits to the area where the electronic device is located, information on how long the electronic device 100 stays at the position, and the like.

Table 1 below shows an example of the area information.

TABLE 1

| Area | Wi-Fi AP list | Wi-Fi AP signal intensity | Type of activated app/number of activations of app | Number of visits to area | Time when electronic device stays |
|---|---|---|---|---|---|
| Bus stop | A | High | Bus app (20) Game app (15) | 20 times/ month | Average 10 minutes |
|  | B | Medium |  |  |  |
|  | C | Low |  |  |  |

Referring to Table 1, when the position of the electronic device 100 is the bus stop, a Wi-Fi AP list recognized at the bus stop may be A, B and C, and each recognized signal intensity may be a high, a medium and a low. In addition, types of apps activated in the electronic device 100 at the position may be the bus app and the game app, and the electronic device 100 stores that the bus app and the game app may be activated 20 times and 15 times, respectively. In addition, the electronic device 100 stores that the electronic device 100 visits the area 20 times per month, and the electronic device 100 stays at the position for 10 minutes on average. Thus, the area information may include the information on the area recognized using GPS information, the information on the Wi-Fi AP list, the information on the signal intensity of the Wi-Fi AP, the information on the type of the activated app, the number of visits to the area, and the information on how long the electronic device 100 stays at the position.

The electronic device 100 may automatically store and update the area information in consideration of an entrance area of the electronic device 100, the number of visits of the entrance area, a length of stay at the entrance area, and the like. The area information may be individually configured by a user, and when the electronic device 100 recognizes a specific AP according to the configuration, the electronic device 100 determines an automatically executed app.

The electronic device 100 determines whether the electronic device 100 enters a POI, using the AP information in the area information, at step 303. The POI, when the number of visits to an area is greater than or equal to a critical value, may be designated as the area.

The electronic device 100 compares the Wi-Fi AP list and the Wi-Fi AP signal intensity information in an area information with the pre-stored and mapped AP information, and when a value of a comparison between the stored AP information and the Wi-Fi AP list and the Wi-Fi AP signal intensity information in the area information is greater than or equal to a critical value, as a result of the comparison, the electronic device 100 determines that the area is the same as the POI. However, when the value of the comparison is less than or equal to the critical value, the electronic device 100 determines that the area is not the same as the POI.

When the electronic device 100 enters the POI, the electronic device 100 executes the app corresponding to the POI, at step 305. For example, the app corresponding to the POI may be executed automatically or through a specific gesture of a user. The specific gesture may include an operation in which the user shakes the electronic device 100, an operation in which the user pushes a home button of the electronic device 100 for a designated time, and an operation in which the user inputs a specific drag pattern to the display 150 of the electronic device 100.

Next, the electronic device 100 updates the area information for the position of the electronic device 100, at step 307.

In contrast, when the electronic device 100 does not enter the POI, the electronic device 100 identifies the distance between the position of the electronic device 100 and a peripheral POI and the movement of the electronic device 100. The electronic device 100 determines a scan period of the area information corresponding to the distance and the movement, at step 309.

Figure 3B:
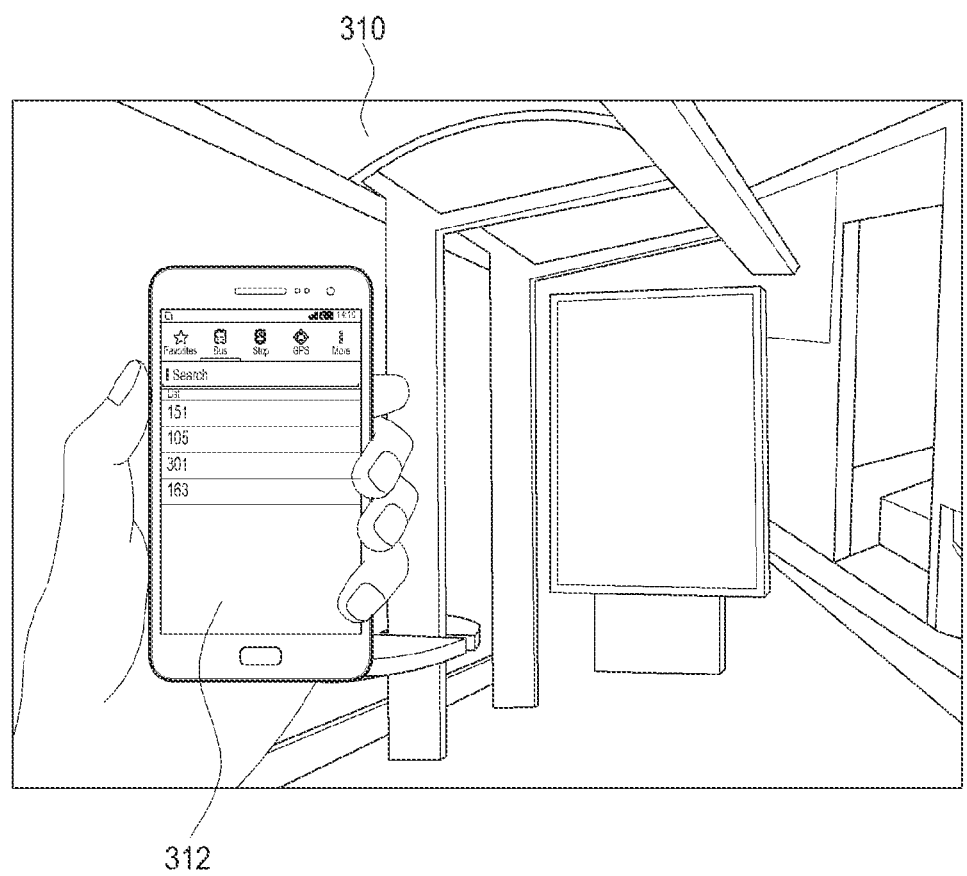
FIG. 3B is a diagram illustrating a method of use of an electronic device, according to an embodiment of the present invention.

FIG. 3B is a diagram illustrating a method of use of the electronic device 100, according to an embodiment of the present invention.

Referring to FIG. 3B, the electronic device 100 identifies area information for a current position. That is, the electronic device 100 compares AP information recognized at the current position and pre-stored area information to identify whether the area is the same as the POI. When the area is determined to be the same as the POI, the electronic device 100 executes an app 312 corresponding to the POI. For example, when a bus stop 310 is configured as the POI, the electronic device 100 executes the app 312, which is mainly used by a user at the bus stop 310, automatically or through a specific gesture of the user. The app 312 may be a bus app and may inform of a type of a bus stopped at the bus stop, a current position of the bus, and the like.

Figure 3C:
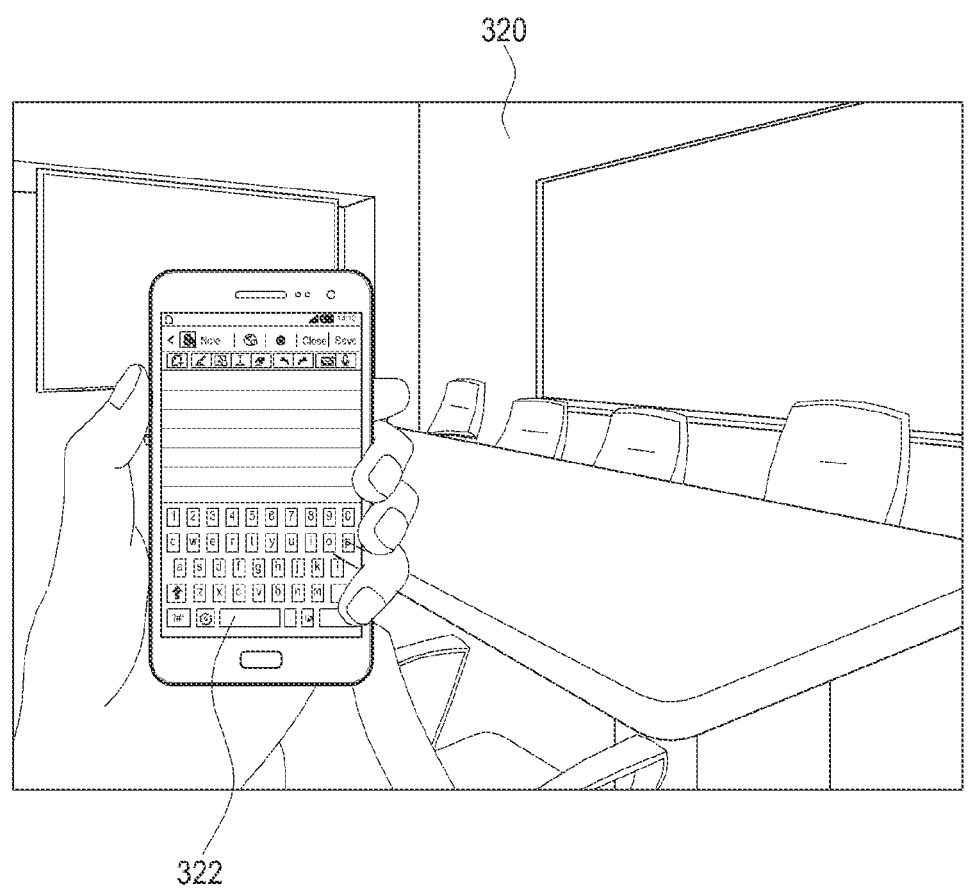
FIG. 3C is a diagram illustrating a method of use of an electronic device, according to an embodiment of the present invention.

FIG. 3C is a diagram illustrating a method of use of the electronic device 100, according to an embodiment of the present invention.

Referring to FIG. 3C, the electronic device 100 identifies area information for a current position. That is, the electronic device 100 compares AP information recognized at the current position and pre-stored area information to identify whether the area is the same as a POI. When the area is determined to be the same as the POI, the electronic device 100 executes an app 322 corresponding to the POI. For example, when a conference room 320 is configured as the POI, the electronic device 100 executes the app 322, which is mainly used by a user in the conference room, automatically or through a specific gesture of the user. The app 322 may be a memo app and may include a key pad on which a memo may be written, an edition list, and the like.

A process described below with reference to FIG. 4 may be prior to the process of identifying the area information for the position of the electronic device 100.

Figure 4:
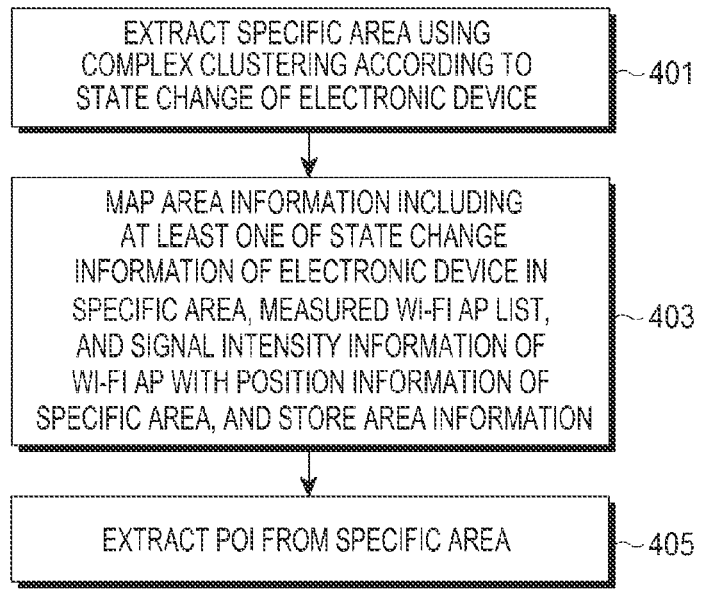
FIG. 4 is a flowchart illustrating a method for extracting a specific area from a POI, according to an embodiment of the present invention.

FIG. 4 is a flowchart illustrating a method for extracting a specific area from a POI, according to an embodiment of the present invention.

Referring to FIG. 4, the electronic device 100 extracts a specific area using complex clustering according to state change information of the electronic device 100, at step 401. The state information of the electronic device 100 may include information on how long the electronic device 100 stays at a position, information on an activated app, information on telephone use, and information on messenger use. For example, when the electronic device 100 uses a telephone, the electronic device 100 extracts the specific area using complex clustering.

Complex clustering includes, for example, grid map-based clustering and a K-means clustering, and the specific area may be extracted using the grid map-based clustering and the K-means clustering. The electronic device 100 determines a scan period of a Wi-Fi AP, using the extracted specific area. The electronic device 100 scans the Wi-Fi AP at only the specific area, and, thus, the electronic device 100 can reduce unnecessary battery consumption.

For example, the specific area may be each area divided by the electronic device 100 such that the electronic device 100 extracts the POI. Alternatively, how long the electronic device 100 stays in a specific area may be calculated, and the specific area may be determined to be an area where the calculated time is equal to or longer than a critical value. The specific area may be defined as an area where a visit number is lower than that of the POI, but, a visit number is comparatively greater than that of other areas or a length of stay is longer than that of the other areas.

Thus, after the electronic device 100 designates the specific area, the electronic device 100 maps the specific area information including at least one of the state change information of the electronic device 100 at the specific area, the information on the measured Wi-Fi AP list, and the information on the signal intensity of the Wi-Fi AP with the position information of the specific area, and stores the area information including at least one of the state change information of the electronic device 100 at the specific area, the information on the measured Wi-Fi AP list, the information on the signal intensity of the Wi-Fi AP, and the position information of the specific area, at step 403.

For example, when the electronic device 100 designates a bus stop as the specific area, the electronic device 100 maps information on a Wi-Fi AP list and a Wi-Fi AP signal intensity measured at the bus stop with position information of the bus stop and stores the information on the Wi-Fi AP list and the Wi-Fi AP signal intensity measured at the bus stop and the position information of the bus stop. In addition, the state change information (e.g., telephone use and a use of a specific app) of the electronic device 100 at the bus stop may be additionally mapped and stored in the mapped information.

The electronic device 100 extracts the POI from the specific area, using the area information for the specific area, at step 405.

For example, the electronic device 100 compares a Wi-Fi AP list of the area where the electronic device 100 is positioned and a Wi-Fi AP list pre-stored in the electronic device 100 of the specific area, and when a value of the comparison is greater than or equal to a critical value, determines that the area is an area corresponding to the pre-stored Wi-Fi AP list. The electronic device 100 calculates the number of visits to the specific area, and when the number of visits is greater than or equal to a critical value, the electronic device 100 determines that the specific area is the POI.

When the electronic device 100 determines that the area where the electronic device 100 is positioned and the pre-stored specific area are the same, the electronic device 100 identifies how long the electronic device 100 stays in specific area, and when the identified time is equal to or longer than a critical value, the electronic device 100 determines that the specific area is the POI.

Figure 5A:
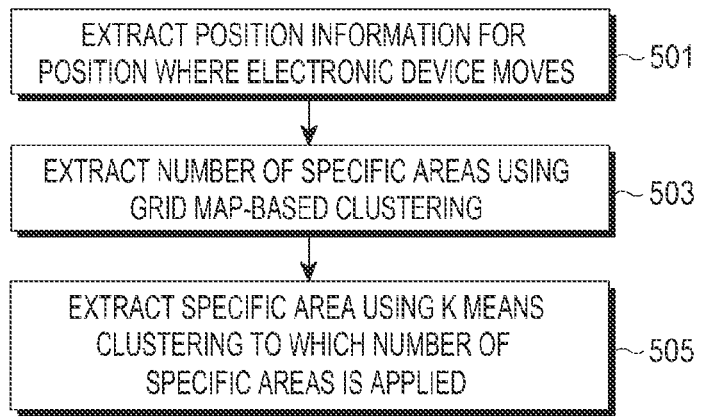
FIG. 5A is a flowchart illustrating a method for extracting a specific area, according to an embodiment of the present invention.
Figure 5B:
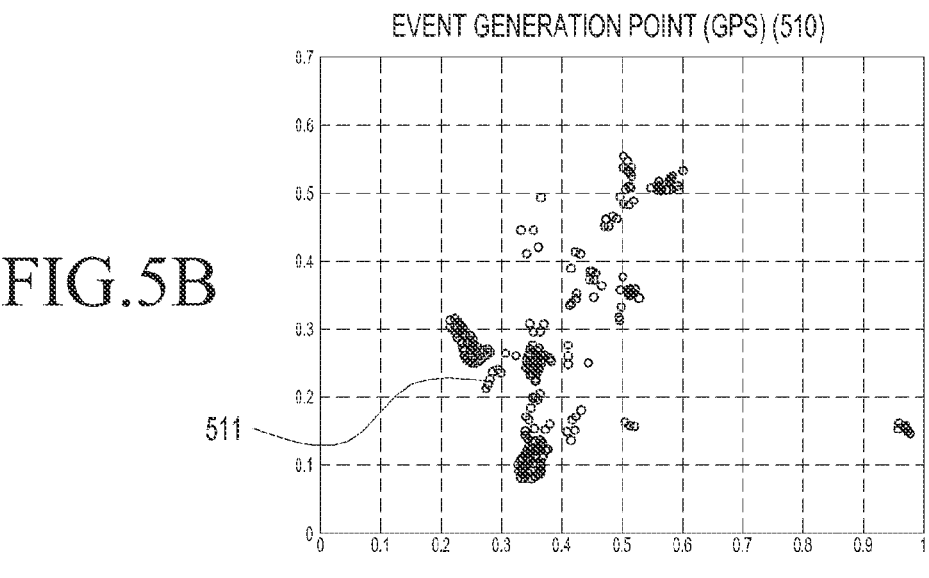
FIGS. 5B-5D are diagrams illustrating a method in which an electronic device extracts a specific area, according to an embodiment of the present invention.
Figure 5C:
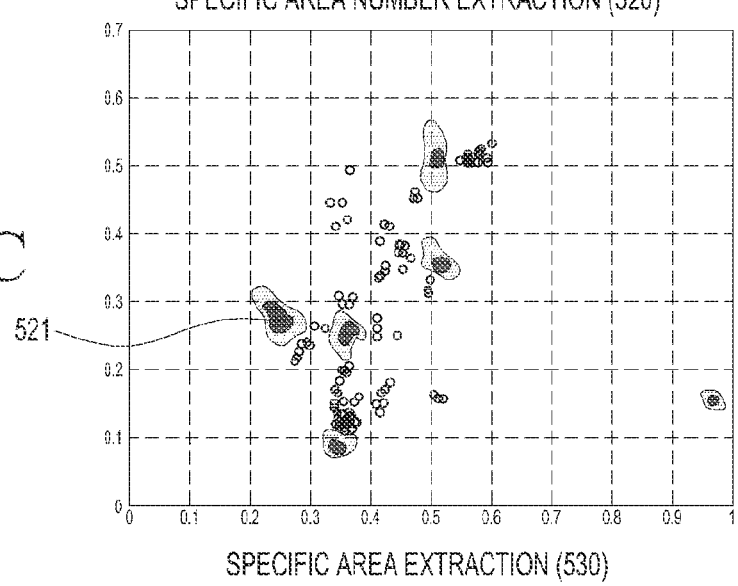
Figure 5D:
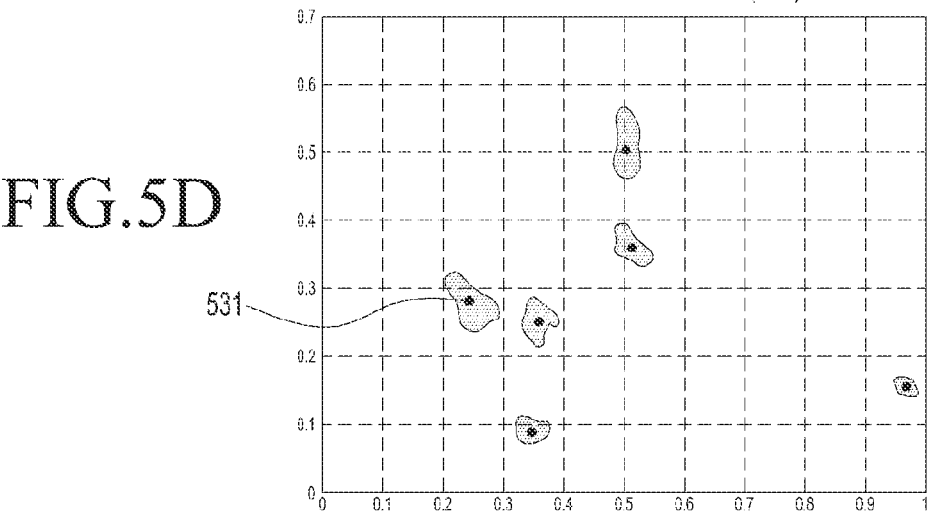

FIG. 5A is a flowchart illustrating a method for extracting a specific area, and FIGS. 5B-5D are diagrams illustrating a method in which the electronic device 100 extracts a specific area, according to an embodiment of the present invention.

Referring to FIGS. 5A-5D, the electronic device 100 extracts position information for the current position of the electronic device 100, at step 501. For example, the electronic device 100 matches an event generation point on a GPS coordinate 510 and stores the event generation point. Thus, the electronic device 100 identifies event generation point 511 of the electronic device 100 through the GPS coordinate 510 (FIG. 5B). The event generation point 511 may be determined according to the state change information of the electronic device 100. For example, the event generation point 511 may be a place where the electronic device 100 executes a specific app or the electronic device 100 executes a telephone call function. In addition, when the electronic device 100 stays at a point for a predetermined time, the point may be the event generation point 511.

The electronic device 100 extract the number of the specific areas, using the grid map-based clustering, at step 503. For example, the electronic device 100 extracts the number of the specific areas 521 (FIG. 5C), using grid map-based clustering of an area where the event generation point 511 of the electronic device 100 on the GPS coordinate 520 are concentrated. For example, the grid map-based clustering may designate an area group according to a predetermined condition, with respect to randomly distributed position information. The number of the specific areas on the GPS coordinate 520 may be six, or more or less than six.

Thus, the electronic device 100 extracts the specific area, using K-means clustering to which the number of specific areas is applied, at step 505.

For example, the electronic device 100 determines six, which is the number of the extracted specific areas, as a random constant of the K-means clustering and extracts a specific area 531 (FIG. 5D) on the GPS coordinate 530 using the K-means clustering. For example, the K-means clustering determines an area group and a central position of the area group according to the random constant. The electronic device 100 maps the state information of the electronic device 100 with the position information at the specific area and stores the state information of the electronic device 100 and the position information at the specific area. The extraction of the specific area by the electronic device 100 is for minimizing a calculation amount of the electronic device 100 and for increasing an accuracy of an extraction of the POI.

Figure 6A:
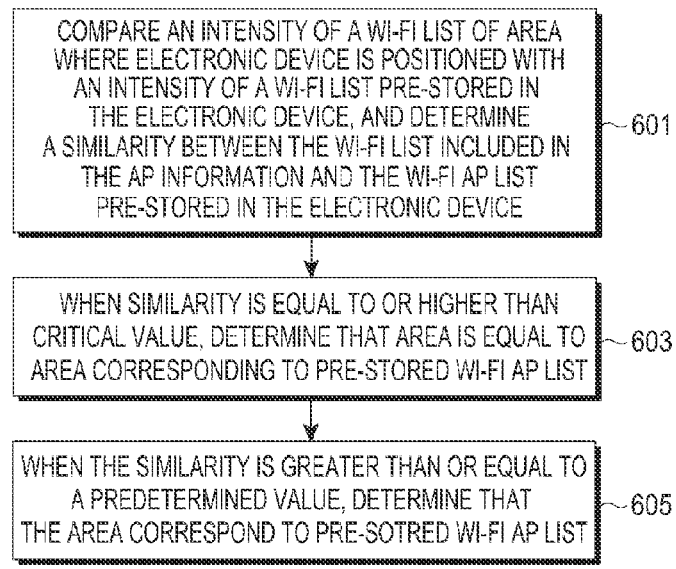
FIG. 6A is a flowchart illustrating a method for extracting a POI from a specific area, according to an embodiment of the present invention.
Figure 6B:
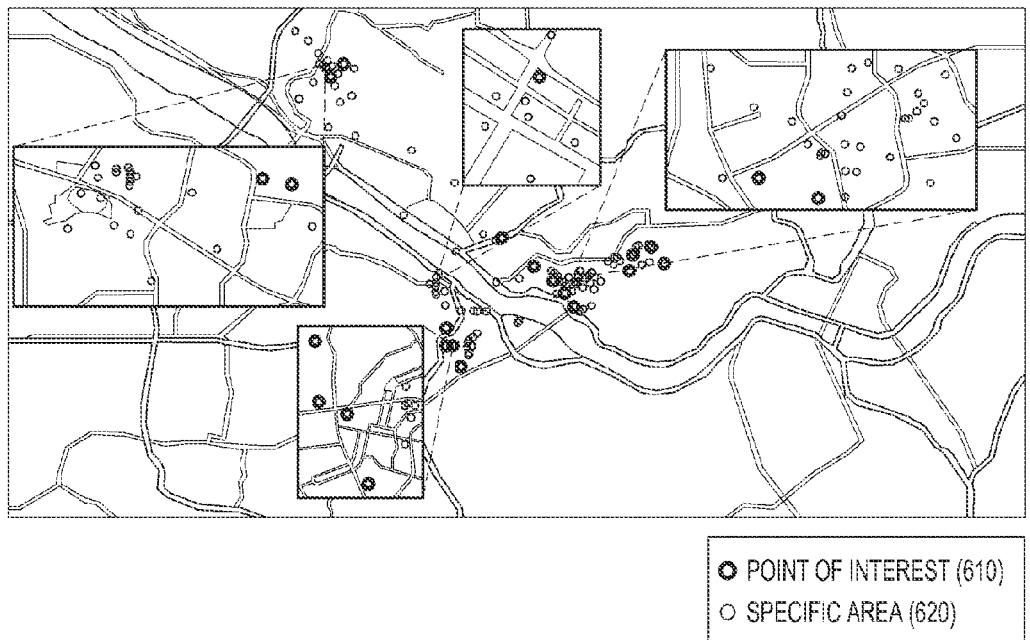
FIG. 6B is a diagram illustrating a POI extracted by an electronic device and a specific area, according to an embodiment of the present invention.

FIG. 6A is a flowchart illustrating a method for extracting a POI from a specific area, and FIG. 6B is a diagram illustrating a POI extracted by the electronic device 100 and a specific area, according to an embodiment of the present invention.

Referring to FIGS. 6A and 6B, the electronic device 100 compares an intensity of a Wi-Fi AP list of an area where the electronic device 100 is positioned with an intensity of a Wi-Fi AP list pre-stored in the electronic device 100, and determines a similarity between the Wi-Fi list included in the AP information and the Wi-Fi AP list pre-stored in the electronic device, at step 601.

When the similarity is greater than or equal to a predetermined value, determines that the area correspond to pre-stored Wi-Fi AP list, at step 603.

For example, Table 2 shows the Wi-Fi AP list, the Wi-Fi AP intensity and the position information of the area where the electronic device 100 is positioned, and the Wi-Fi AP list, the Wi-Fi AP intensity and the position information pre-stored in the electronic device 100.

TABLE 2

| Wi-Fi AP list, Wi-Fi AP intensity and position information of area where electronic device is positioned | | | Wi-Fi AP list, Wi-Fi AP intensity and position information pre-stored in electronic device | | |
|---|---|---|---|---|---|
| Position information | Wi-Fi AP list | Wi-Fi AP intensity | Position information | Wi-Fi AP list | Wi-Fi AP intensity |
| Conference room A | a | High | Conference room A | a | High |
| | b | Medium | | b | High |
| | c | Low | | d | Medium |

Referring to Table 2, the electronic device 100 compares (see discussion above) a Wi-Fi AP list of an area where the electronic device 100 is positioned and a Wi-Fi AP list pre-stored in the electronic device 100, using the Wi-Fi AP list, the Wi-Fi AP intensity and the position information of the area where the electronic device is positioned, and the Wi-Fi AP list, the Wi-Fi AP intensity and the position information pre-stored in the electronic device.

For example, the comparison may be determined by comparing each signal intensity "high", "medium" and "low" of the Wi-Fi APs "a", "b" and "c" of the area where the electronic device 100 is positioned with each signal intensity "high", "high" and "medium" of the Wi-Fi AP "a", "b" and "d" pre-stored in the electronic device. For example, even though "c" of the Wi-Fi AP of the area where the electronic device 100 is positioned is different from "d" of the Wi-Fi AP pre-stored in the electronic device 100, i.e., the comparison is greater than a predetermined critical value, it may be determined that the area is the area equal to the pre-stored area.

The electronic device 100 calculates the number of visits to the area, and when the number of visits is greater than or equal to a critical value, the electronic device 100 determines that the area is the POI, at step 605. For example, the electronic device 100 calculates the number of visits to the area determined to be the same as a POI, and when the calculated number of visits is greater than or equal to the predetermined critical value, the electronic device 100 determines that the area is the POI. The electronic device calculates how long the electronic device 100 stays in the area determined to be the same as the POI, and when the calculated time is equal to or longer than the predetermined critical value, the electronic device 100 determines that the area is the POI.

Figure 7:
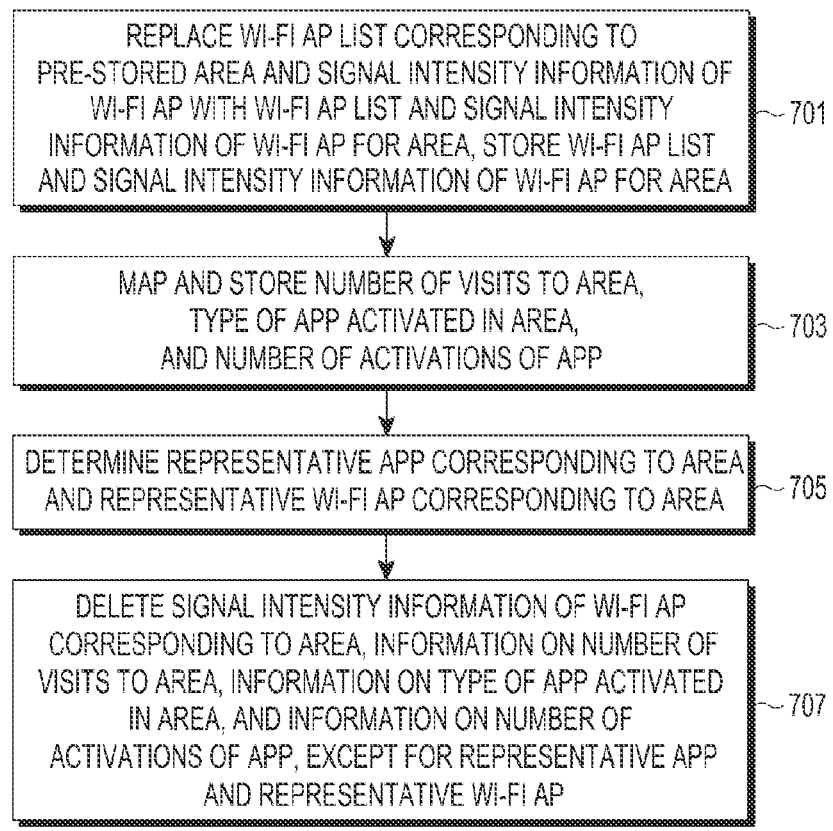
FIG. 7 is a flowchart illustrating a method for updating area information for a position, according to an embodiment of the present invention.

FIG. 7 is a flowchart illustrating a method for updating area information for a position, according to an embodiment of the present invention.

Referring to FIG. 7, the electronic device 100 identifies area information for a position of the electronic device 100. The electronic device 100 determines whether the electronic device 100 enters a POI using the AP information in the area information. The electronic device 100 compares the Wi-Fi AP list and the Wi-Fi AP signal intensity information in the area information with the pre-stored and mapped AP information, and when the comparison between the stored AP information, and the Wi-Fi AP list and the Wi-Fi AP signal intensity information in the area information is greater than or equal to a critical value, the electronic device 100 determines that the area is the same as the POI.

When the electronic device 100 enters the POI, the electronic device 100 replaces the Wi-Fi AP list and the Wi-Fi signal intensity information corresponding to the pre-stored area with the Wi-Fi list and the Wi-Fi signal intensity information for the area, and stores the Wi-Fi list and the Wi-Fi signal intensity information for the area, at step 701. The electronic device 100 maps the number of visits to the area, the type of the app activated in the area and the number of activations of the app, and stores the number of visits to the area, the type of the app activated in the area and the number of activations of the app, at step 703. Thus, the electronic device 100 determines a representative app corresponding to the area and a representative Wi-Fi AP corresponding to the area, at step 705. The electronic device 100 deletes the signal intensity information of the Wi-Fi AP, information on the number of visits to the area, information on the type of the app activated in the area, and information on the number of activations of the app, except for the representative app and the representative Wi-Fi AP, at step 707.

FIGS. 8A-8D are a diagrams illustrating an app executed by the electronic device 100, according to an embodiment of the present invention.

Referring to FIGS. 8A-8D, the electronic device 100 stores the POI and executes the app corresponding to the POI.

Figure 8A:
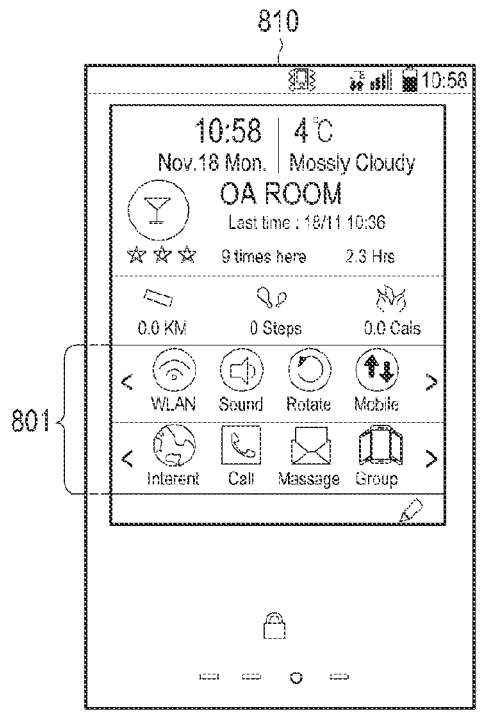
FIGS. 8A-8D are a diagrams illustrating an app executed by an electronic device, according to an embodiment of the present invention.

For example, the electronic device 100 displays a lock state screen 810 including a configuration of the electronic device and an app 801 (FIG. 8A).

Figure 8B:
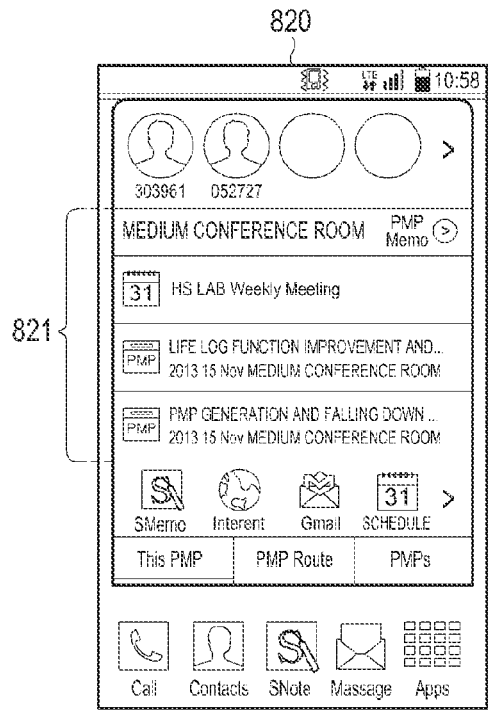

As another example, the electronic device 100 display a PMP screen including individual information 821 for the POI, e.g., a medium conference room, (FIG. 8B). For example, the individual information may include memo contents, information input directly by a user in the POI, or the like.

Figure 8C:
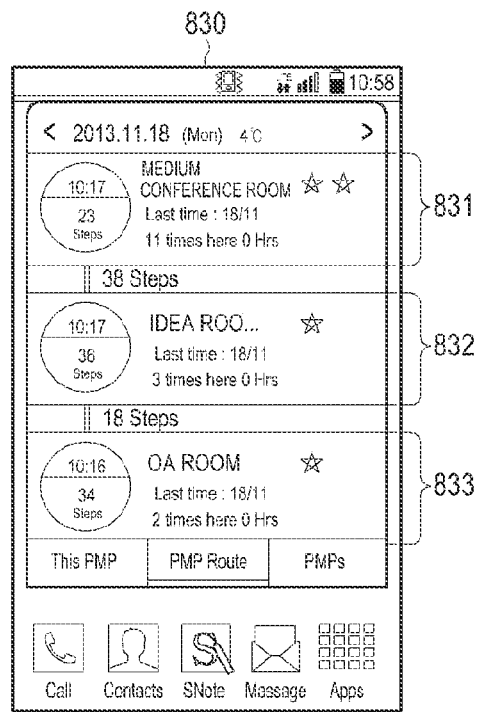

As another example, the electronic device may display a PMP route screen including individual information 831, 832 and 833 for the POIs, e.g., a medium conference room, (FIG. 8C). For example, when the POI is stored as a small conference room (ex., Room No. 1), a medium conference room (ex., Room No. 2) and a large conference room (ex., Room No. 3), the individual information including information on the last visit date and the length of stay in each POI can be displayed a screen 830.

Figure 8D:
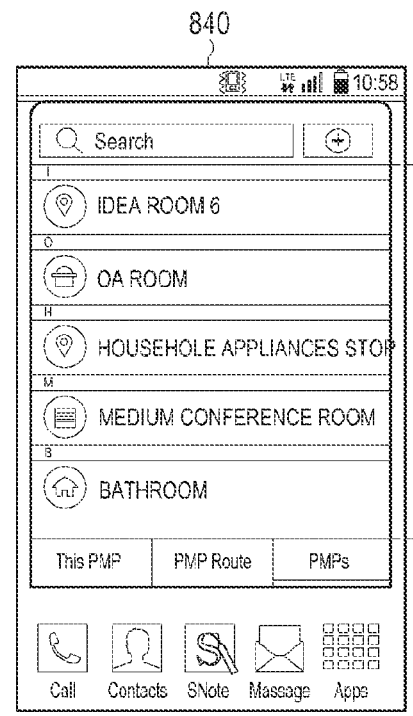

As another example, the electronic device 100 displays a screen 840 including a POI 841 (FIG. 8D). The POI 841 may include, for example, IDEA ROOM6, OA ROOM, a household appliance stop, a medium conference room, a bathroom, and the like.

Figure 9:
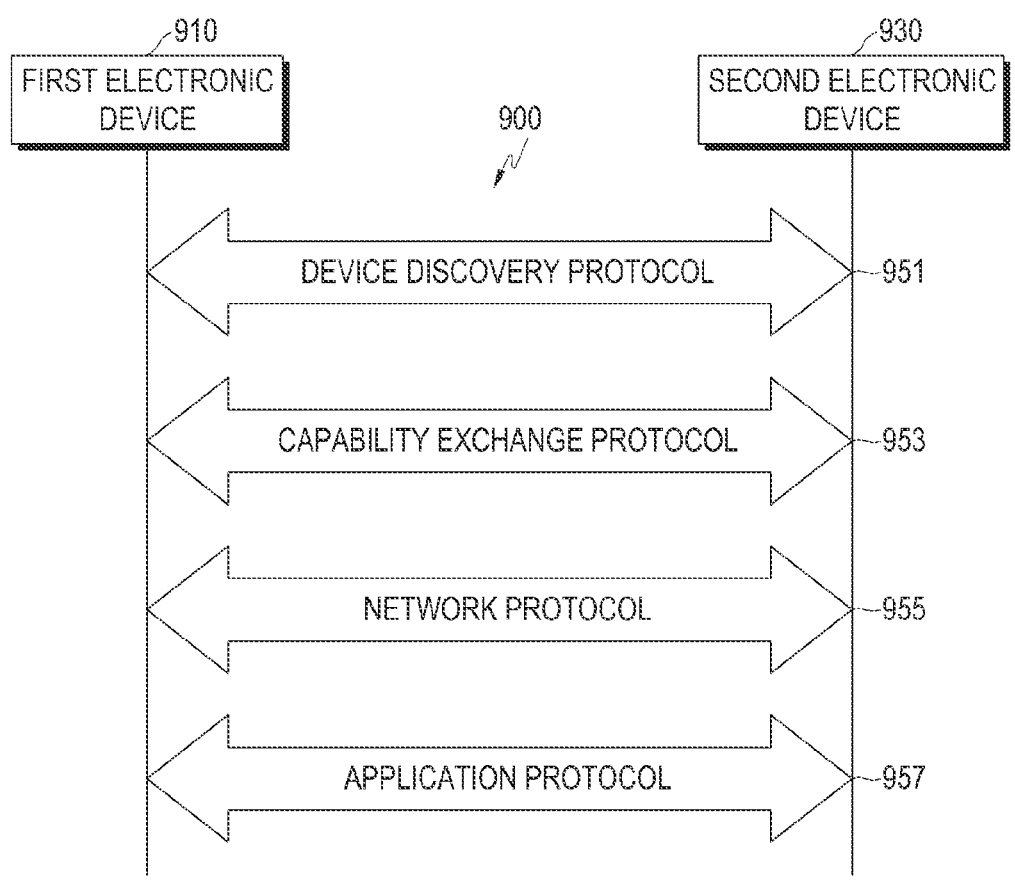
FIG. 9 is a signaling diagram illustrating a communication protocol between electronic devices, according to an embodiment of the present invention.

FIG. 9 is a signaling diagram illustrating a communication protocol between electronic devices, e.g., a first electronic device 900 and a second electronic device 930, according to an embodiment of the present invention.

Referring to FIG. 9, the communication protocol 900 includes a device discovery protocol 951, a capability exchange protocol 953, a network protocol 955, and an application protocol 957.

The device discovery protocol 951 may be a protocol that allows the electronic devices 910, 930 to detect an external electronic device, e.g., external electronic device 104, capable of communicating therewith or to connect the detected external electronic device thereto. For example, the electronic device 910 detects the electronic device 930 as a device capable of communicating through a usable communication method (e.g., Wi-Fi, BT, USB or the like) with the electronic device 910, using the device discovery protocol 951. For communication with the electronic device 930, the electronic device 910 acquires and stores identification information on the detected electronic device 930 using the device discovery protocol 951. The electronic device 910 establishes the communication with the electronic device 930, based on the identification information.

The device discovery protocol 951 may be a protocol for mutual authentication between a plurality of electronic devices. For example, the electronic device 910 performs an authentication between the electronic device 910 and the electronic device 930 based on communication information (for example, a Media Access Control (MAC) address, a Universally Unique IDentifier (UUID), a SubSystem IDentification (SSID), and an Information Provider (IP) address) for the connection with the electronic device 930.

The capability exchange protocol 953 may be a protocol for exchanging information related to a service function, which can be supported by at least one of the electronic device 910 and the electronic device 930. For example, the electronic device 910 and the electronic device 930 may mutually exchange information related to currently provided service functions through the capability exchange protocol 953. The exchangeable information may include identification information indicating a particular service from among a plurality of services, which can be supported by the electronic device 910 or the electronic device 930. For example, the electronic device 910 receives identification information of a particular service, provided by the electronic device 953, from the electronic device 930 through the capability exchange protocol 953. The first electronic device 910 determines whether the electronic device 910 supports the particular service, based on the received identification information.

The network protocol 955 may be a protocol for controlling a flow of data transmitted and received in order to interlock and provide a service between the electronic devices 910, 930. For example, the electronic device 910 and/or the electronic device 930 controls an error or data quality using the network protocol 955. Additionally or alternatively, the network protocol 955 determines a transmission format of data transmitted/received between the electronic device 910 and the electronic device 930. In addition, using the network protocol 955, the electronic device 910 and/or the electronic device 930 performs session management (e.g., session connection or session termination) for data exchange between the electronic devices.

The application protocol 957 may be a protocol for providing a procedure or information for exchanging data related to a service provided to an external electronic device. For example, the electronic device 910 (or the electronic device 100) provides a service to the electronic device 930 through the application protocol 957.

The communication protocol 900 may include a standard communication protocol, a communication protocol designated by an individual or organization (for example, a communication protocol self-designated by a communication device manufacturing company or a network supplying company) or a combination thereof.

Figure 10:
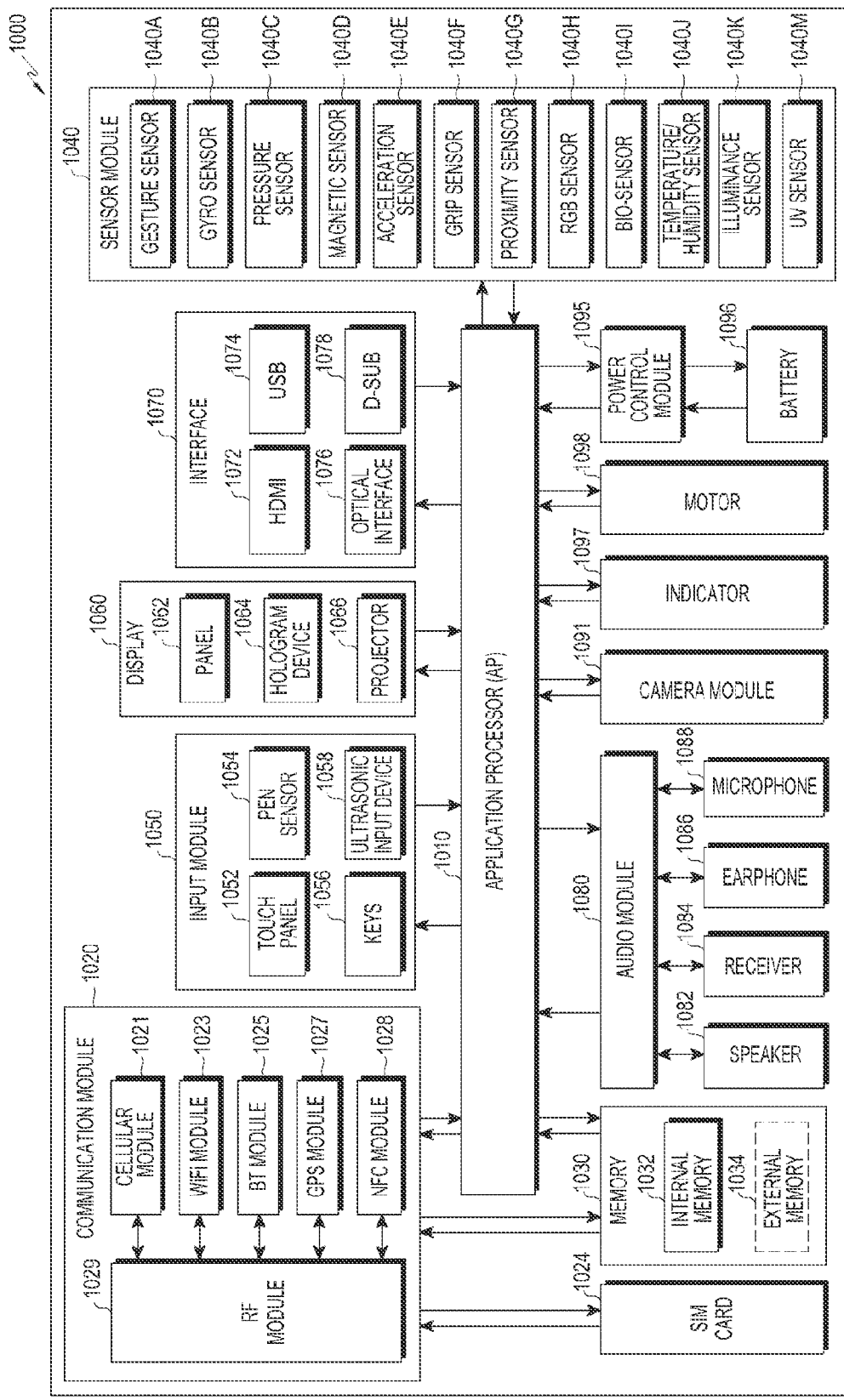
FIG. 10 is a diagram illustrating components of an electronic device, according to an embodiment of the present invention.

FIG. 10 is a diagram illustrating components of an electronic device 1000, according to an embodiment of the present invention.

The electronic device 1000 may constitute, for example, all or a part of the electronic device 100 illustrated in FIG. 1. The electronic device 1000 may include at least one Application Processor (AP) 1010, a communication module 1020, a Subscriber Identification Module (SIM) card 1024, a memory 1030, a sensor module 1040, an input module 1050, a display 1060, an interface 1070, an audio module 1080, a camera module 1091, a power management module 1095, a battery 1096, an indicator 1097, and a motor 1098.

The AP 1010 controls a plurality of hardware or software components connected thereto by driving an operating system or an application program, process various types of data including multimedia data, and perform calculations. The AP 1010 may be embodied in a System on Chip (SoC). The AP 1010 may further include a Graphic Processing Unit (GPU).

The communication module 1020 performs data transmission/reception in a communication between the electronic device 1000 and other electronic devices (e.g., the electronic device 104 or the server 106) connected thereto through a network. The communication module 1020 includes a cellular module 1021, a Wi-Fi module 1023, a BT module 1025, a GPS module 1027, an NFC module 1028, and a Radio Frequency (RF) module 1029.

The cellular module 1021 provides a voice call, a video call, an SMS service, an Internet service, and the like through a communication network (e.g., LTE, LTE-A, CDMA, WCDMA, UMTS, WiBro, or GSM). Also, the cellular module 1021 identifies and authenticates an electronic device in a communication network by using, for example, the SIM card 1024. The cellular module 1021 performs at least some functions which the AP 1010 can provide. For example, the cellular module 1021 may perform at least a part of the multimedia control function.

The cellular module 1021 may include a Communication Processor (CP). Furthermore, the cellular module 1021 may be embodied in a SoC. Although the elements such as the cellular module 1021 (e.g., the communication processor), the memory 1030, and the power management module 1095 are illustrated to be separate from the AP 1010 in FIG. 10, the AP 1010 may be implemented to include at least some of the above described elements (e.g., the cellular module 1021) according to one embodiment.

The AP 1010 or the cellular module 1021 (for example, a communication processor) loads, to a volatile memory, commands or data received from at least one of a non-volatile memory and other component elements connected thereto, and may processes the loaded commands or data. Furthermore, the AP 1010 or the cellular module 1021 stores, in a non-volatile memory, data received from or generated by at least one of the other components.

The Wi-Fi module 1023, the BT module 1025, the GPS module 1027, or the NFC module 1028 may include, for example, a processor for processing data transmitted/received through the corresponding module. Although the cellular module 1021, the Wi-Fi module 1023, the BT module 1025, the GPS module 1027, and the NFC module 1028 are illustrated as separate blocks in FIG. 10, at least some (for example, two or more) of the cellular module 1021, the Wi-Fi module 1023, the BT module 1025, the GPS module 1027, and the NFC module 1028 may be included on one IC or one IC package. For example, at least some (e.g., the communication processor corresponding to the cellular module 1021 and the Wi-Fi processor corresponding to the Wi-Fi module 1023) of the processors corresponding to the cellular module 1021, the Wi-Fi module 1023, the BT module 1025, the GPS module 1027, or the NFC module 1028 may be implemented by one SoC.

The RF module 1029 transmits/receives data, for example, an RF signal. Although not illustrated, the RF module 1029 may include, for example, a transceiver, a Power Amp Module (PAM), a frequency filter, a Low Noise Amplifier (LNA) or the like. Also, the RF module 1029 may further include a component for transmitting and receiving electromagnetic waves in a free space in a wireless communication, for example, a conductor, a conductive wire, or the like. Although the cellular module 1021, the Wi-Fi module 1023, the BT module 1025, the GPS module 1027, and the NFC module 1028 share one RF module 1029 in FIG. 10, at least one of the cellular module 1021, the Wi-Fi module 1023, the BT module 1025, the GPS module 1027, and the NFC module 1028 may transmit/receive an RF signal through a separate RF module.

The SIM card 1024 may be a card including a subscriber identification module and may be inserted into a slot formed in a particular portion of the electronic device 1000. The SIM card 1024 may include unique identification information (for example, an Integrated Circuit Card IDentifier (ICCID)) or subscriber information (for example, an International Mobile Subscriber IDentity (IMSI)).

The memory 1030 includes an internal memory 1032 or an external memory 1034. The internal memory 1032 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

The internal memory 1032 may be a Solid State Drive (SSD). The external memory 1034 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 1034 may be functionally connected to the electronic device 1000 through various interfaces. The electronic device 1000 may further include a storage device (or storage medium) such as a hard drive.

The sensor module 1040 measures a physical quantity or detects an operating state of the electronic device 1000 and converts the measured or detected information into an electronic signal. The sensor module 1040 may include, but is not limited to, a gesture sensor 1040A, a gyro sensor 1040B, an atmospheric pressure sensor 1040C, a magnetic sensor 1040D, an acceleration sensor 1040E, a grip sensor 1040F, a proximity sensor 10406, a color sensor 1040H (for example, a Red/Green/Blue (RGB) sensor), a biometric sensor 1040I, a temperature/humidity sensor 1040J, an illumination sensor 1040K, and an Ultra Violet (UV) sensor 1040M. Additionally or alternatively, the sensor module 1040 may include, for example, an E-nose sensor, an ElectroMyoGraphy (EMG) sensor, an ElectroEncephaloGram (EEG) sensor, an ElectroCardioGram (ECG) sensor, an InfraRed (IR) sensor, an iris sensor, a fingerprint sensor, or the like. The sensor module 1040 may further include a control circuit for controlling at least one sensor included in the sensor module 1040.

The input device 1050 includes a touch panel 1052, a (digital) pen sensor 1054, a key 1056, or an ultrasonic input device 1058. The touch panel 1052 recognizes a touch input through at least one of, for example, a capacitive type, a resistive type, an infrared type, and an ultrasonic type method. The touch panel 1052 may further include a control circuit. In the instance of the capacitive type touch panel, physical contact or proximity recognition is possible. The touch panel 1052 may further include a tactile layer. In this case, the touch panel 1052 may provide a tactile reaction to a user.

The (digital) pen sensor 1054 may be implemented, for example, using the same or similar method for receiving a user's touch input or using a separate recognition sheet. The key 1056 may include, for example, a physical button, an optical key or a keypad. The ultrasonic input device 1058 is a device that can identify data by generating an ultrasonic signal through an input tool (e.g., pen) and detecting a sonic wave through a microphone (e.g., microphone 1088) in the electronic device 1000, and is capable of wireless recognition. The electronic device 1000 may also receive a user input from an external device (for example, a computer or server) connected thereto, using the communication module 1020.

The display 1060 (for example, the display 1050) includes a panel 1062, a hologram device 1064, or a projector 1066. The panel 1062 may be, for example, a Liquid Crystal Display (LCD) or an Active Matrix Organic Light Emitting Diode (AM-OLED). The panel 1062 may be, for example, flexible, transparent, or wearable. The panel 1062 may also be configured as one module together with the touch panel 1052. The hologram device 1064 may show a stereoscopic image in the air by using interference of light. The projector 1066 may project light onto a screen to display an image. For example, the screen may be located inside or outside the electronic device 1000. The display 1060 may further include a control circuit for controlling the panel 1062, the hologram device 1064, or the projector 1066.

The interface 1070 includes, for example, a High-Definition Multimedia Interface (HDMI) 1072, a Universal Serial Bus (USB) 1074, an optical interface 1076, or a D-subminiature (D-sub) 1078. The interface 1070 may be included in, for example, the communication interface 160 illustrated in FIG. 1. Additionally or alternatively, the interface 290 may include, for example, a Mobile High-definition Link (MHL) interface, a Secure Digital (SD) card/MultiMedia Card (MMC) interface, or an Infrared Data Association (IrDA) standard interface.

The audio module 1080 bilaterally converts a sound and an electronic signal. At least some elements of the audio module 1080 may be included in, for example, the input/output interface 100 illustrated in FIG. 1. The audio module 1080 processes voice information input or output through, for example, the speaker 1082, a receiver 1084, earphones 1086, or the microphone 1088.

The camera module 1091 photographs a still image and a video. The camera module 291 includes one or more image sensors (for example, a front sensor or a rear sensor), a lens, an Image Signal Processor (ISP) or a flash (for example, an LED or xenon lamp).

The power management module 1095 manages power of the electronic device 1000. Although not illustrated, the power management module 1095 may include, for example, a Power Management Integrated Circuit (PMIC), a charger Integrated Circuit (IC), or a battery gauge.

The PMIC may be mounted to, for example, an integrated circuit or an SoC semiconductor. Charging methods may be classified into a wired charging method and a wireless charging method. The charger IC may charge a battery and prevent over voltage or over current from a charger. The charger IC may include a charger IC for at least one of the wired charging method and the wireless charging method. Examples of the wireless charging method may include a magnetic resonance type, a magnetic induction type, or an electromagnetic wave type, and an additional circuit for wireless charging, such as a coil loop circuit, a resonance circuit, or a rectifier circuit may be added.

The battery gauge may measure, for example, the remaining amount of battery life, a charging voltage and current, or temperature. The battery 1096 may store or generate electricity and supply power to the electronic device 1000 using the stored or generated electricity. The battery 1096 may include, for example, a rechargeable battery or a solar battery.

The indicator 1097 may indicate particular states (e.g., a booting state, a message state, a charging state, etc.) of the electronic device 1000 or a part (e.g., the AP 1010) of the electronic device 1000. The motor 1098 may convert an electrical signal into mechanical vibration. Although not illustrated, the electronic device 1000 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

The aforementioned elements of the electronic device 1000 may be constituted by one or more components, and the name of the corresponding element may vary with a type of electronic device. The electronic device 1000 may include at least one of the aforementioned elements. Some elements may be omitted or other additional elements may be further included in the electronic device 1000. Further, some of the components of the electronic device 1000 according to the various embodiments of the present invention may be combined to form a single entity, and thus, may equivalently execute functions of the corresponding elements prior to the combination.

At least a part of the electronic devices 100, 1000 (for example, modules or functions thereof) or a method (for example, operations) may be embodied by, for example, a command stored in a non-transitory computer readable storage medium in a form of a programming module. When a command is executed by one or more processors (for example, the processor 122), the one or more processors may execute a function corresponding to the command. The nontransitory computer-readable storage medium may be, for example, the memory 130. At least a part of the programming module may be implemented (for example, executed) by, for example, the processor 210. At least a part of the programming module may include, for example, a module, a program, a routine, a set of instructions and/or a process for performing one or more functions.

The non-transitory computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

A module or a programming module may include at least one of the described component elements, a few of the component elements may be omitted, or additional component elements may be included. Operations executed by a module, a programming module, or other component elements may be executed sequentially, in parallel, repeatedly, or in a heuristic manner. Further, some operations may be executed according to another order or may be omitted, or other operations may be added.

In a storage medium storing instructions, the instructions are configured to perform at least one operation by at least one processor when the instructions are executed by at least one processor. At least one operation may include identifying area information for the electronic devices 100, 1000, and determining whether the electronic devices 100, 1000 enters a POI, using AP information in the area information, in a method of recognizing an area by the electronic device.

While the present invention has been shown and described with reference to various embodiments thereof, it should be understood by those skilled in the art that many variations and modifications of the method and apparatus described herein will still fall within the spirit and scope of the present invention as defined in the appended claims and their equivalents.

What is claimed is:

1. A method of recognizing an area by an electronic device, the method comprising:
    identifying area information, received from an Access Point (AP), for the electronic device; and
    determining whether the electronic device enters a Point Of Interest (POI), using AP information inducted in the identified area information;
    extracting a specific area using grid map-based clustering and K-Means clustering;
    mapping specific area information, including at least one of a Wi-Fi AP list measured in the specific area, AP information including signal intensity information of the AP, and state change information of the electronic device, with position information of the specific areas; and
    storing the mapped specific area information; and extracting the POI from the specific area.

2. The method of claim 1, wherein the identified area information further includes position information for the electronic device, and
    wherein the AP information includes at least one of a Wi-Fi AP list and signal intensity information of the AP.

3. The method of claim 1, wherein a scan period for identifying the area information is determined according to state information of the electronic device.

4. The method of claim 3, wherein the state information of the electronic device includes at least one of information on how long the electronic device stays at a particular position, information on an activated application (app), information on telephone use, and information on messenger use.

5. The method of claim 1, further comprising:

identifying an app corresponding to the POI; and
executing the app, when the electronic device enters the POI.

6. The method of claim 1, wherein determining whether the electronic device enters the POI using the AP information included in the identified area information comprises:
comparing an intensity of a Wi-Fi AP list included in the AP information with an intensity of a Wi-Fi AP list pre-stored in the electronic device;
determining a similarity between the Wi-Fi AP list included in the AP information and the Wi-Fi AP list pre-stored in the electronic device, by using the compared intensity; and
when the similarity is greater than or equal to a predetermined value, determining that the electronic device is in the POI.

7. The method of claim 1, wherein extracting the POI from the specific area comprises: comparing an intensity of the Wi-Fi AP list of the specific area with an intensity of a Wi-Fi AP list pre-stored in the electronic device, determining a similarity between the Wi-Fi AP list included in the AP information and the Wi-Fi AP list pre-stored in the electronic device, by using the compared intensity, and when the similarity is greater than or equal to a predetermined value, determining that the specific area is an area corresponding to the pre-stored Wi-Fi AP list; calculating a number of visits to the specific area; and when the number of visits is greater than or equal to a predetermined value, determining that the specific area is the POI.

8. The method of claim 1, further comprising:
measuring the AP information in the POI;
identifying whether the AP information is representative AP information stored in a server; and
executing an app corresponding to the representative AP information.

9. The method of claim 1, further comprising:
when it is determined that the electronic device is not in the POI area, identifying a distance between a position of the electronic device and a peripheral POI and a movement of the electronic device; and
determining a scan period of the identified area information corresponding to the identified distance and the movement.

10. The method of claim 1, further comprising:
updating the identified area information for a position of the electronic device.

11. The method of claim 10, wherein updating comprises:
replacing a Wi-Fi AP list pre-stored in the electronic device and signal intensity information of a Wi-Fi AP corresponding to an area of the electronic device with a Wi-Fi AP list and signal intensity information of another Wi-Fi AP for the area, and storing the Wi-Fi AP list and the signal intensity information of the another Wi-Fi AP;
mapping a number of visits to the area, a type of an app activated in the area, and a number of activations of the app with position information of the area; and
storing the number of visits to the area, the type of the app activated in the area, and the number of activations of the app; and
determining a representative app corresponding to the area and a representative Wi-Fi AP corresponding to the area.

12. The method of claim 11, further comprising:
deleting the Wi-Fi AP list and the signal intensity information of the another Wi-Fi AP, the number of visits to the area, the type of the app activated in the area, and the number of activations of the app, except for the representative app and the representative Wi-Fi AP.

13. An electronic device for recognizing an area, the electronic device comprising:
an area recognizing module that identifies area information, received from an Access Point (AP) for the electronic device; and
a processor that determines whether the electronic device enters a Point Of Interest (POI), using AP information included in the identified area information;
wherein the processor extracts a specific area using grid map-based clustering and K-Means clustering, maps specific area information, including at least one of a Wi-Fi AP list measured in the specific area, AP information including signal intensity information of the AP, and
state change information of the electronic device, with position information of the specific area, stores the mapped specific area information, and
extracts the POI from the specific area.

14. The electronic device of claim 13, wherein the identified area information further includes position information for the electronic device, and the AP information includes at least one of a Wi-Fi AP list and signal intensity information of the AP.

15. The electronic device of claim 13, wherein the processor determines a scan period for identifying the area information according to state information of the electronic device.

16. The electronic device of claim 15, wherein the state information of the electronic device includes at least one of information on how long the electronic device stays at a particular position, information on an activated application (app), information on telephone use, and information on messenger use.

17. The electronic device of claim 13, wherein the processor identifies an app corresponding to the POI and executes the app, when the electronic device enters the POI.

18. The electronic device of claim 13, wherein the processor determines whether the electronic device enters the POI using the AP information included in the area information, compares an intensity of a Wi-Fi AP list included in the AP information with an intensity of a Wi-Fi AP list pre-stored in the electronic device, determines a similarity between the Wi-Fi AP list included in the AP information and the Wi-Fi AP list pre-stored in the electronic device, by using the compared intensity and when the similarity is greater than or equal to a predetermined value, determines that the electronic device is in the POI.

19. The electronic device of claim 13, wherein the processor compares an intensity of the Wi-Fi AP list of the specific area with an intensity of a Wi-Fi AP list pre-stored in the electronic device, determines a similarity between the Wi-Fi AP list included in the AP information and the Wi-Fi AP list pre-stored in the electronic device, by using the compared intensity, and when the similarity is greater than or equal to a predetermined value, determines that the specific area is equal to an area corresponding to the pre-stored Wi-Fi AP list, calculates a number of visits to the specific area, and when the number of visits is greater than or equal to a predetermined value, determines that the area is the POI.

20. The electronic device of claim 13, wherein the processor measures the AP information in the POI, identifies whether the AP information is representative AP information stored in a server, and executes an app corresponding to the representative AP information.

21. The electronic device of claim 13, wherein, when the processor determines that the electronic device is not in the POI area, the processor identifies a distance between a position of the electronic device and a peripheral POI and a movement of the electronic device, and determines a scan period of the identified area information corresponding to the identified distance and the movement.

22. The electronic device of claim 13, wherein the processor updates the identified area information for a position of the electronic device.

23. The electronic device of claim 22, wherein the processor replaces a pre-stored Wi-Fi AP list and signal intensity information of the Wi-Fi AP corresponding to an area of the electronic device with a Wi-Fi AP list and signal intensity information of another Wi-Fi AP for the area, stores the Wi-Fi AP list and the signal intensity information of the another Wi-Fi AP, maps the number of visits to the area, a type of an app activated in the area, and the number of activations of the app with the position information of the area, stores the number of visits to the area, the type of the app activated in the area, and the number of activations of the app, and determines a representative app corresponding to the area and a representative Wi-Fi AP corresponding to the area.

24. The electronic device of claim 23, wherein the processor deletes the Wi-Fi AP list and the signal intensity information of the another Wi-Fi AP, the number of visits to the area, the type of the app activated in the area, and the number of activations of the app, except for the representative app and the representative Wi-Fi AP.

* * * * *